United States Patent [19]

Braithwaite et al.

[11] 4,370,997
[45] Feb. 1, 1983

[54] PRESSURE REGULATOR AND SAFETY VALVE ASSEMBLY

[75] Inventors: John D. Braithwaite, Maidenhead; Derrick O. King, Old Windsor; Sidney J. Williams, Virginia Water, all of England

[73] Assignee: Black & Decker Inc., Newark, Del.

[21] Appl. No.: 221,901

[22] Filed: Dec. 31, 1980

[30] Foreign Application Priority Data

Jan. 3, 1980 [GB] United Kingdom ............ 8000177

[51] Int. Cl.³ .................................................. G05D 11/00
[52] U.S. Cl. ................................. 137/116.3; 137/318; 137/377; 222/5; 251/149.9
[58] Field of Search .................... 222/5, 153, 399; 137/116.3, 116.5, 318, 377, 384; 251/90, 111, 89.5, 83, 149.9

[56] References Cited

U.S. PATENT DOCUMENTS

| Re. 19,087 | 2/1934 | Minor | 251/90 |
|---|---|---|---|
| 1,361,636 | 12/1920 | Stage | 137/116.3 |
| 2,634,748 | 4/1953 | Morrison | 251/83 |
| 3,250,288 | 5/1966 | Hammon | 137/116.3 |
| 3,558,010 | 1/1971 | Zenger et al. | 222/5 |
| 3,776,227 | 12/1973 | Pitesky | 222/5 |
| 4,132,245 | 1/1979 | Johnson | 137/377 |

FOREIGN PATENT DOCUMENTS

WO80/00315  3/1980  PCT Int'l Appl.
1511844  5/1978  United Kingdom.

*Primary Examiner*—H. Jay Spiegel
*Attorney, Agent, or Firm*—Walter Ottesen; Edward D. Murphy; Harold Weinstein

[57] ABSTRACT

A pressure regulator and safety valve assembly comprises pressure regulating means and safety valve means. The pressure regulating means is so coupled to the safety valve means that the pressure at which the safety valve means opens varies independence upon the setting of the pressure regulating means. The safety valve means includes a safety valve member mounted for movement relative to a static surface between a closed position in which the safety valve member seals against the static surface and an open position in which the safety valve member is spaced from the static surface.

3 Claims, 2 Drawing Figures

PRESSURE REGULATOR AND SAFETY VALVE ASSEMBLY

BACKGROUND OF THE INVENTION

This invention relates to a pressure regulator and safety valve assembly.

A great many varieties of fluid pressure regulators are known and these are used in a wide variety of applications to adjust the pressure within a contained volume. Usually it is necessary to provide a safety valve to ensure that the pressure in the contained volume does not exceed a predetermined limit. Such an excess pressure can be developed if, for example, the pressure regulating mechanism sticks. Without a safety valve this could lead to an increase of pressure within the contained volume to a level at which the boundary walls defining the contained volume are likely to fail. Thus it is common practice to fit a safety valve on a boundary wall of the contained volume with the safety valve set to open at a predetermined pressure above the normal working pressure but below the pressure at which the boundary walls of the contained volume could fail.

This arrangement is reasonably satisfactory provided the working pressure of the contained volume remains constant and provided the maximum safe pressure in the contained volume remains constant. However, there are situations where the working pressure varies widely according to the use to which the apparatus is to be put and also where the maximum safe pressure varies widely. In this case, it is possible that for a first use there is a low working pressure and a low maximum safe pressure and for a second use there is a high working pressure and a high maximum safe pressure. In order to prevent false opening of the safety valve in the second use, the safety valve must be arranged to open above the high working pressure of the second use, but this pressure may be greater than the maximum safe pressure of the first use, so that the safety valve is ineffective in this first use.

In order to overcome this problem it has been proposed to provide a pressure regulator including a safety valve arranged such that the pressure at which the safety valve opens varies in dependence upon the setting of the pressure regulating means. An example of such a regulator is described in British Patent Specification No. 1,511,844 in the name of Francis Xavier Kay.

In such a regulator the working pressure is controlled by movement of a piston acted upon on one side by a compression spring and on the other side by the pressurized gas. The regulated pressure is adjusted by altering the compression in the spring. The piston has a central aperture normally closed by a safety valve member but, in the event of excess pressure developing, the piston moves towards the spring adding to the compression in the spring and this movement of the piston causes relative movement of the piston and the safety valve member such that the central aperture in the piston is vented.

With such a regulator, however, one possible cause of the development of excess pressure is the sticking of the piston. In this case the piston will not move and consequently there is no relative movement of the piston and safety valve member and the safety valve remains closed. This is a serious disadvantage.

SUMMARY OF THE INVENTION

It is an object of the invention to provide an improved pressure regulator and safety valve assembly.

According to the invention there is provided a pressure regulator and safety valve assembly comprising pressure regulating means and safety valve means, the pressure regulating means being so coupled to the safety valve means that the pressure at which the safety valve means opens varies in dependence upon the setting of the pressure regulating means, wherein the safety valve means includes a safety valve member mounted for movement relative to a static surface between a closed position in which the safety valve member seals against the static surface and an open position in which the safety valve member is spaced from the static surface.

Since the safety valve means is coupled to the pressure regulating means the threshold pressure at which the safety valve is opened can be arranged to rise when the pressure regulator is set to regulate at a higher pressure. Thus with this arrangement it is possible to use the same pressure regulator and safety valve assembly over a wide range of working pressure and for each of these working pressures provide safety valve means which opens at a pressure which is a predetermined amount above the respective working pressure and may be below the highest working pressure of the regulator. Furthermore since the safety valve member seals against a static surface rather than a mobile piston, the safety valve member is not prevented from operating effectively by the piston sticking. The assembly may for example be used to control the supply of pressurised gas from for example a gas capsule to a container to which the assembly is connected. The required working pressure in the container will depend upon the nature of the container. For example if the container is a liquid dispensing apparatus such as a container from which paint is fed to an applicator, the required working gauge pressure may be relatively low, for example, 15 pounds per square inch but if the container is a mastic gun the required working gauge pressure may be much higher, for example, 45 pounds per square inch. The same regulator and safety valve assembly embodying the present invention may be used safely to pressurise either of these containers.

The safety valve member may be resiliently biased into the closed position and movable from the closed position against the resilient bias to the open position. Change of the setting of the pressure regulating means may be arranged to change the resilient bias acting on the safety valve member. This is a particularly simple and effective method of coupling the pressure regulating means and the safety valve means.

The safety valve means may be arranged such that when the pressure regulating means is set at the "off" position (zero gauge pressure) the safety valve member is in the open position. This ensures that each time the pressure regulating means is returned to the "off" position the safety valve member is moved thereby ensuring that the safety valve member cannot become stuck.

Control means, which may be a control knob, may be provided for setting the pressure regulating means and the safety valve member may be linked to the control knob such that, when the control means is returned to the "off" position, the safety valve member is moved to the open position through a mechanical linkage. This ensures that once the control means is at the "off" position the safety valve member is in the open position.

The pressure regulating means may include a valve member mounted in a passage providing communication between a high pressure chamber and a low pressure chamber, and a regulating member co-operable with the valve member and movable away from one position in which the valve member is open, the regulating member being biased to said one position by a spring and being biased away from said one position by the pressure of gas in the low pressure chamber.

The regulating member may be a piston.

The safety valve member may be located around the regulating member.

The pressure regulator and safety valve assembly may be incorporated in a pressurising device. The pressurising device may include a housing for receiving a capsule of liquefied or pressurised gas. The housing may be removable to allow insertion or removal of a gas capsule. Preferably the housing and the pressure regulator and safety valve assembly are linked such that the housing cannot be removed unless the pressure regulator is set at the "off" position.

The pressurising device may include a regulated pressure outlet port at a location remote from the pressure regulating means and the safety valve means, the outlet port being connected to a chamber housing the pressure regulating means and the safety valve means by an elongate passage. This arrangement reduces the possibility of a fluid entering the outlet port and reaching the pressure regulating means and safety valve means where, according to the nature of the fluid, these parts might be deleteriously affected.

BRIEF DESCRIPTION OF THE DRAWINGS

By way of example, certain illustrative embodiments of the invention will now be described with reference to the drawings, in which.

DETAILED DESCRIPTION OF THE PREFERRED EMBODIMENTS

Figure 1:
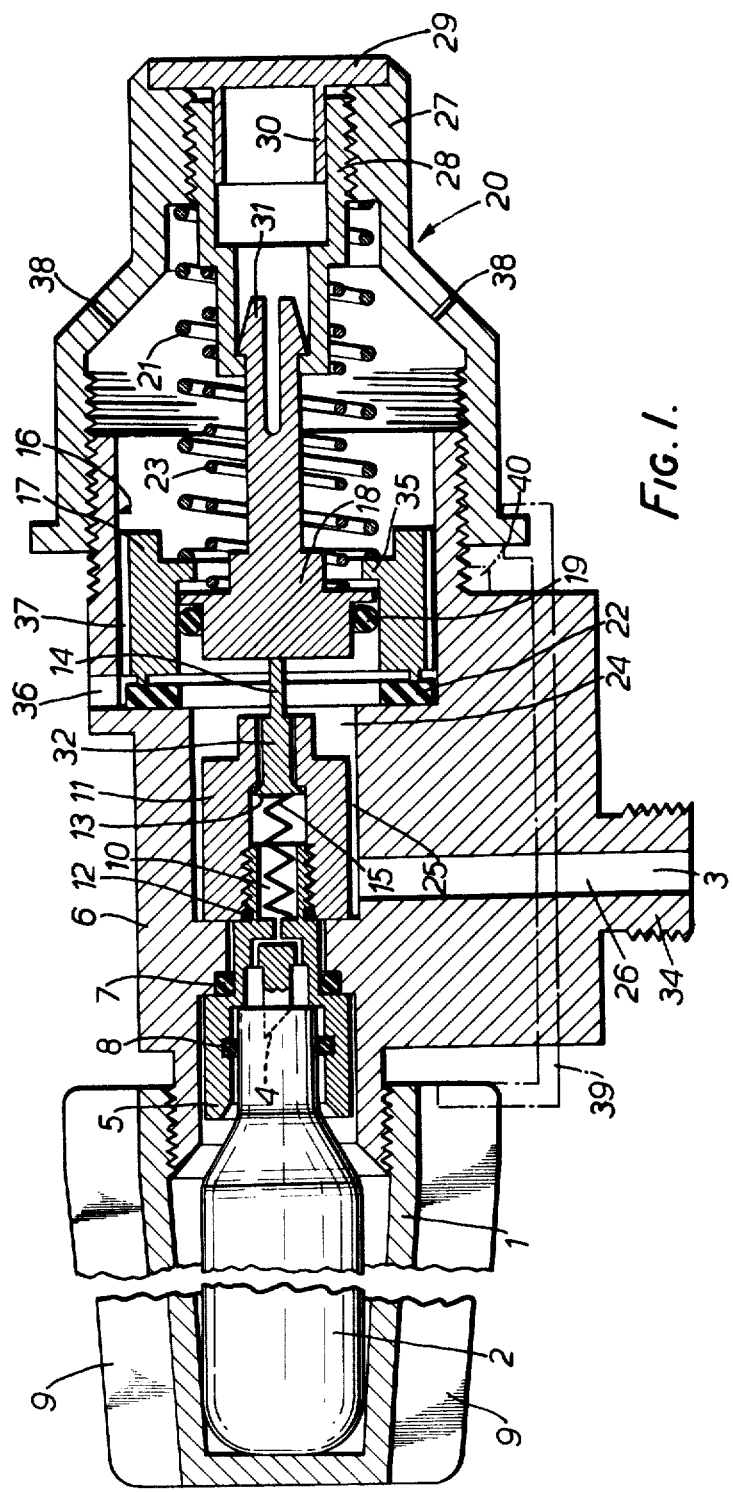
FIG. 1 is a sectional view of a pressurizing device incorporating a pressure regulator and safety valve assembly.

The pressurising device shown in FIG. 1 includes a housing 1 for receiving a capsule 2 of liquefied or pressurised gas, for example a capsule of liquid carbon dioxide and pressure regulating means which provides a reduced pressure outlet at a regulated pressure at an outlet port 3 of the device. Safety valve means are associated with the pressure regulating means.

The arrangement for receiving the capsule 2 will now be described more fully. A capsule piercing member 5 including a piercer 4 is received in the body 6 of the device and an 'O' ring 7 seals the interface of the piercing member 5 and the body 6. The end of the piercing member 5 adjacent the capsule housing 1 has a bore sized to receive the neck of the capsule 2 and an 'O' ring 8 is seated in the bore to seal the interface of the capsule neck and the bore.

The housing 1 is provided with external radially projecting fins 9.

To insert a capsule 2 into the pressurising device the housing 1 is first unscrewed. The capsule 2 is then placed in the housing 1 and the housing brought into position to be screwed on to the body 6. At this stage the neck of the capsule 2 is in sealing engagement with the piercing member 5 but the capsule is to the left of the position shown in FIG. 1 so that the capsule is not yet pierced. As the housing 1 is now screwed on to the body 6 by a user gripping the fins 9 of the housing, the housing drives the capsule on to the piercer 4 and the capsule is pierced allowing gas to flow along a fluid path from the capsule through the piercing member 5 into a chamber 10 defined by the piercing member 5 and a valve housing 11 which is screwed on to the piercing member and whose interface with the piercing member is sealed by an 'O' ring 12.

To remove a capsule 2 the housing 1 is unscrewed and the capsule 2 withdrawn from the piercing member 5. In order to facilitate withdrawal of the capsule 2, the housing 1 may have one or more openings in its side through which the capsule is placed in the housing and the leading end of the housing may include inwardly projecting portions which surround the neck of the capsule so that when the housing 1 is unscrewed the capsule 2 is automatically withdrawn from the piercing member 5 and comes away with the housing 1 from which it is then removed.

The chamber 10 is the high pressure chamber of a pressure regulator and safety valve assembly which will now be described. The valve housing 11 slidably receives a valve member 32 which has a closure head 13 at one end that is in the chamber 10 and a protruding stem 14 at the other end. The closure head 13 abuts a seat formed on the housing 11 and is resiliently biased by a weak spring 15 against the seat.

The right hand end (as seen in FIG. 1) of the body 6 has a bore 16 in which an approximately annular safety valve member 17 is slidably received. A piston 18 is slidably received within the safety valve member 17 and an 'O' ring 19 is provided around the piston 18 to seal the interface of the piston 18 and the safety valve member 17. The bore 16 is closed by a cap assembly 20 screwed on to the exterior of the body 6.

The safety valve member 17 is inwardly biased by a compression spring 21 against a seal 22 fixed to the end wall of the bore 16, and the piston 18 is inwardly biased by a compression spring 23. In the position shown in FIG. 1 the stem 14 of the valve member 32 abuts the piston 18. A chamber 24 is defined between the valve housing 11 and the piston 18; this chamber communicates via a narrow annular duct 25 and a narrow passageway 26 with the outlet port 3.

The cap assembly 20 comprises an operating member 27 screw-threaded on the body 6, an adjusting member 28 screwed into an axial bore of the member 27 and a closure member 29 which fits over the outer end of the axial passage in the member 27 and has a sleeve 30 which is a force fit in an axial recess in the adjusting member 28. Prior to insertion of the closure member 29 the adjusting member 28 may be screwed into or out of the member 27 to adjust their relative axial positions. Once the closure member 29 is fitted, however, the adjusting member 28 is connected and locked to the operating member 27. The spring 21 extends between the safety valve member 17 and the operating member 27 while the spring 23 extends between the piston 18 and the adjusting member 28.

The maximum separation of the piston 18 and the adjusting member 28 is limited by the engagement of an anchor 31 extending from the piston 18 to the adjusting member 28.

When the pressurising device is to be used, it is attached for example by means of a screw threaded boss 34 surrounding the outlet port 3 to an apparatus on which it is to be used. Sealing means (not shown) are provided either on the body 6 or on the part to which the body 6 is attached to seal the connection of the pressurising device to the apparatus. For the sake of example, it will be assumed that the pressurising device is connected to a paint container having an outlet pipe through which paint passes to an applicator when the paint container is pressurised. With the pressurising device attached to the container the operating member 27 is unscrewed to a position to the right of that shown in FIG. 1. As the operating member 27 is unscrewed the anchor 31 engages the adjusting member 28 and the piston 18 is drawn back. As the piston 18 is drawn back, it engages a shoulder 35 on the safety valve member 17 so that the safety valve member is drawn back. As soon as the safety valve member lifts off the seal 22, the chamber 24 is connected to atmosphere via a hole 36 in the body 6 and also via longitudinal grooves 37 formed in the outer periphery of the safety valve member and openings 38 in the operating member 27.

A stop (not shown) is preferably provided to limit the extent to which the operating member 27 can be unscrewed and define the "off" position of the operating member. With the operating member 27 in the "off" position, a capsule is inserted in the manner already described. Preferably a linkage 39, indicated schematically in FIG. 1, is provided so that the housing 1 cannot be screwed on to or off the body 6 except when the operating member 27 is in the "off" position. In the schematic illustration this is achieved by arranging for part of the linkage 39 to protrude into the path of the fins 9 of the housing except when the operating member 27 is in the "off" position.

As the capsule is pierced pressurised gas flows into the chamber 10 and the valve member 32, being closed and out of contact with the piston 18, prevents further flow of the gas.

In order to pressurise the container, the operating member 27 is screwed to the left (as seen in FIG. 1). This first allows the safety valve member 17 to return into engagement with the seal 22 thereby sealing the chamber 24 and also returns the piston 18 to the position shown in FIG. 1. As the piston 18 reaches this position it contacts the stem 14 of the valve member 32 and further movement of the piston moves the valve member 32 to the left lifting the closure head 13 off its seat. As the closure head 13 lifts off its seat pressurised gas flows into the chamber 24 through the duct 25 and passageway 26 and into the container.

As the container becomes pressurised the pressure in the chamber 24 rises and urges the piston 18 outwards. The bias of the spring 23, however, acts to urge the piston inwards. Thus, once the pressure in the chamber 24 reaches a value at which the forces acting on the piston are greater than the spring bias force and any frictional force the piston 18 moves back to the right and when it reaches the position shown in FIG. 1 the valve member 32 returns to its closed position.

If the pressure in the container drops, for example as a result of paint being fed from the container, the force exerted by the spring 23 on the piston 18 will overcome the gas pressure force and the piston will move to the left moving the valve member 32 to its open position. Thus the piston 18 and the spring 23 regulate the pressure in the container. Screwing the operating member 27 to the left compresses the spring 23 and increases the spring bias force on the piston 18 thereby increasing the regulated pressure. For maximum pressure the operating member 27 is screwed fully on to the body 6. If a lower maximum pressure is required, then this can be achieved simply by providing an insert 40 such as that shown in dotted outline between the member 27 and the body 6 to prevent the operating member being screwed fully on to the body 6.

Since the spring 23 extends between the adjustment member 28 and the piston 18 the regulated pressure also depends on the relative axial position of the adjustment member 28 relative to the operating member 27. This relative position is set in the factory according to the desired maximum pressure that is required and the closure member 29 is then located over the adjusting member. A similar adjustment means may be provided for the spring 21 to allow the pressure at which the safety valve opens to be set in the factory.

A similar method could be used to provide independent adjustment of the spring 21.

In the event of the valve member 32 becoming stuck or for some reason being ineffective, the force of pressurised gas acting on the inner face of the safety valve member 17 builds up until the resilient bias force provided by the spring 21 is overcome and the safety valve member 17 moves to the right lifting off the seal 22 and allowing pressurized gas to pass out to atmosphere through the hole 36 or via the longitudinal grooves 37 and the openings 38. At certain settings of the operating member 27, a further force may be provided to open the safety valve member, namely a force exerted by the piston 18 on the shoulder 35.

The safety valve member 17 moves from its closed position when the resilient bias force provided by the spring 21 is overcome. The resilient bias force depends on the position of the operating member 27 and will increase as the operating member is moved to the left. Thus the force required to move the safety valve member 17 to its open position increases as the pressure setting is increased by moving the operating member 27 to the left. In this way it is possible to arrange that the pressure in chamber 24 required to actuate the safety valve member is always a predetermined amount greater than the intended working pressure.

Since the pressure regulator and safety valve assembly is connected to the container only via a narrow passage comprising the passageway 26 and the duct 25 it is most unlikely that the contents of the container will reach the moving parts of the regulator assembly, particularly as pressurised gas flows down the passage. Furthermore any build up of a deposit tending to stick the safety valve member 17 is prevented since each time the operating member is returned to a zero pressure setting the safety valve member is forced, by the rigid mechanical connection via the anchor 31, to lift off the seal 22.

In order to ensure further that the pressure regulator and safety valve assembly are not exposed to the contents of a container fitted to the boss 34, a porous plug may be fitted in the passageway 26 such as to allow the flow of gas but inhibit the flow of liquids.

The pressurising device shown in FIG. 1 may be used in a wide variety of applications without substantial modifications. For example, the device may be used at low pressure, for example ten pounds per square inch, to dispense a liquid from a container; for this low pressure operation an insert 40 is provided to limit the extent to which the cap 27 can be screwed on to the body 6. Alternatively, the device may be used at high pressure, for example fifty pounds per square inch, to dispense a very viscous mastic material from a suitable dispenser. In each case, without any alteration to the assembly, the safety valve will open at a pressure a predetermined amount above the working pressure.

In the pressurising device shown, a piston 18 is used. As an alternative a diaphragm sealed to the inner wall of the safety valve member 17 and spring biased in the same manner as the piston 18 could be used, the piston 18 and 'O' ring 19 being omitted. The diaphragm would be coupled to the anchor 31 to achieve the same function as the coupling of the piston to the anchor 31.

Figure 2:
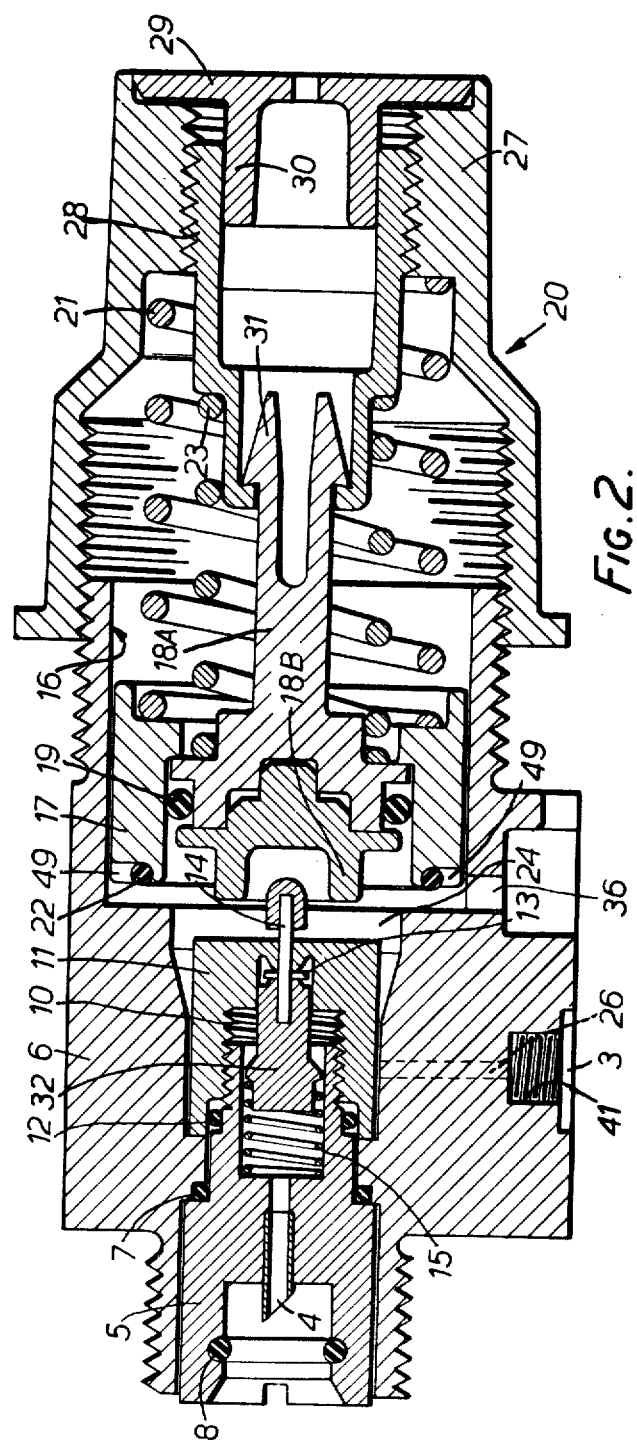
FIG. 2 is a sectional view of a modified form of the device shown in FIG. 1.

FIG. 2 shows a device very similar to that shown in FIG. 1 but incorporating various modifications, the more important of which will now be described. In FIG. 2 parts corresponding with parts in FIG. 1 are designated by the same reference numeral. In FIG. 2 the piston and safety valve member are shown in a retracted position, and the gas capsule 2 and housing 1 are not shown.

In the device of FIG. 2 the seal 22 is defined by an 'O' ring provided in a recess in the first face of the safety valve member 17. On the outer side of the 'O' ring, the safety valve member has a series of apertures 49 which, when the safety valve member abuts the confronting face of the body 6, ensure that the outer side of the 'O' ring remains at atmospheric pressure and therefore eliminate any tendency of the 'O' ring to separate from the valve member 17.

The piston is made in two parts 18A and 18B press fitted together and each part has a flange which limits axial movement of the 'O' ring 19 relative to the piston.

When the safety valve member 17 is retracted pressurized gas in the chamber 24 is vented through a port 36 at the bottom of the device. Grooves corresponding to the longitudinal grooves 37 and openings 38 are not provided in the device of FIG. 2.

The device of FIG. 2 has a screw threaded recess 41, in place of the boss 34, to enable it to be attached to an apparatus on which it is to be used.

It will be understood that the various modifications of the device of FIG. 1 that are shown in FIG. 2 may be applied in any combination to the device of FIG. 1.

What is claimed is:

1. A pressure regulator and safety valve assembly, comprising:
   a body having a chamber therein with an inlet and an outlet, and said body having a bore therein in communication with said chamber;
   pressure regulating means, associated with said inlet, for regulating the pressure in said chamber;
   a safety valve member mounted for movement relative to a static surface in said body between a closed position in which the safety valve member seals against the static surface and an open position in which the safety valve member is spaced from the static surface and vents said chamber externally of said body;
   said safety valve member being slidably received in said bore and having a face in communication with said chamber, and said safety valve member being annular with a shoulder;
   a first spring resiliently urging said safety valve member against said static surface whereby when the pressure in said chamber acting upon said face overcomes the bias force of said first spring said safety valve member is lifted off said static surface to vent said chamber to atmosphere;
   said pressure regulating means comprising a piston slidably and sealingly received within said safety valve member, and a second spring resiliently urging said piston towards said chamber;
   a control member movably mounted on said body and operatively connected to said pressure regulating means for normally turning said pressure regulating means on and off, and for readily adjusting the setting thereof during normal use of the assembly;
   said control member also being operatively connected to said safety valve member whereby normal adjusting of said pressure regulating means by said control member simultaneously changes the setting of the safety valve member in dependence upon the setting of the pressure regulating means;
   said piston having an anchor extending therefrom which is engaged by said control member to positively withdraw said piston away from said chamber when said control member is moved to the "off" position; and
   said piston engaging said shoulder to positively lift said safety valve member away from said static surface when said control member is moved to the "off" position.

2. A pressure regulator and safety valve assembly, comprising:
   a body having a chamber therein having an inlet and an outlet for gas being regulated in pressure;
   a housing, for receiving a capsule of liquified or pressurized gas, removably screwed to said body and having projecting fins;
   a valve for closing said inlet;
   a first movable member resiliently biased to open said valve, and being acted upon by the pressure of the gas in said chamber to allow said valve to close, whereby the pressure at said outlet is regulated;
   a second movable member located around said first movable member and resiliently biased against a seat associated with said chamber, said second movable member communicating with said chamber and being displaceable off said seat to vent said chamber to atmosphere upon the pressure in said chamber acting directly upon said second movable member exceeding a predetermined pressure;
   a control member for turning the pressure regulator on and off, said control member having an adjusting member concealed therein and adjustably secured thereto for preadjusting the resilient bias acting upon said first movable member, said adjusting member being factory set and being inaccessible during normal operation of the assembly;
   said control member being movably mounted on said body for simultaneously adjusting the resilient biases acting on both said first and second movable members, whereby said predetermined pressure is automatically adjusted in relation to the regulated pressure; and
   an interlocking linkage extending between said housing and said control member, and having one end connected to said control member for movement thereby and having a part at the other end protruding into the path of said fins except when said control member is in the "off" position, whereby said housing cannot be screwed on to or off said body except when said control member is in the "off" position.

3. A pressure regulator and safety valve assembly, comprising:
- a body having a chamber therein with an inlet and an outlet, and said body having a bore therein communicating with said chamber;
- a housing, for receiving a capsule of liquified or pressurized gas, connected to said body and communicating with said inlet;
- a valve for closing said inlet;
- a pressure regulating piston biased by a first spring to open said valve, and being urged by the pressure of the gas in said chamber against the bias of said first spring to allow said valve to close, whereby the pressure at said outlet is regulated;
- an annular safety valve member slidably received in said bore, and biased by a second spring against a seat associated with said chamber and at one end of said bore, said safety valve member being in communication with said chamber and being displaceable off said seat to vent said chamber to atmosphere upon the force of the pressure in said chamber acting directly upon said safety valve member overcoming the bias force of said second spring;
- said pressure regulating piston being slidably received within said annular safety valve member, the latter having a shoulder which is engageable by said pressure regulating piston to exert a further force acting to displace said safety valve member off said seat to vent said chamber to atmosphere upon the pressure in said chamber becoming uncontrolled if said safety valve member has not already been so displaced by the chamber pressure acting directly thereupon;
- a cap assembly, for turning the pressure regulator on and off, screw-threaded to said body and closing the other end of said bore, said first and second springs being received in said cap assembly and compressed thereby, rotation of said cap assembly relative to said body adjusting simultaneously the compressions of said springs, whereby the value of the pressure in said chamber at which the safety valve member opens varies in dependence upon the setting of the pressure regulating member;
- an adjusting member forming part of said cap assembly, said first spring extending between said adjusting member and said pressure regulating piston, whereby the compression of said first spring is adjustable by said adjusting member independently of said second spring; and
- an anchor extending from said pressure regulating piston into said adjusting member and being movable relative thereto, said anchor limiting the movement of said pressure regulating piston relative to said cap under the influence of said first spring, and rotation of said cap to the "off" position causing said anchor to positively withdraw said pressure regulating piston away from said valve and into engagement with said shoulder thereby lifting said safety valve member off its seat.

* * * * *